United States Patent [19]

Pierson et al.

[11] 3,791,323

[45] Feb. 12, 1974

[54] LONG SEAM MACHINE

[76] Inventors: John Oliver Pierson, 25 Downs Park West, Bristol; Roger Douglas White, 36 Horse St., Chipping Sodbury; Bertram Keith Brown, Myllendonk, Medway Dr., Keynsham, all of England

[22] Filed: Nov. 29, 1972

[21] Appl. No.: 310,456

[30] Foreign Application Priority Data
Dec. 1, 1971 Great Britain .................... 55828/71

[52] U.S. Cl. .............................. 112/121.15, 271/54
[51] Int. Cl. .............................................. D05b 21/00
[58] Field of Search..... 112/121.11, 121.15, 121.29, 112/121.24, 2, 203, 207, 212, 214; 271/54, 55, 84, 85; 198/135, 218

[56] References Cited
UNITED STATES PATENTS

| | | | |
|---|---|---|---|
| 1,884,026 | 10/1932 | Lutz | 112/203 |
| 2,845,885 | 8/1958 | Scarrone | 112/203 X |
| 3,443,533 | 5/1969 | Posey et al. | 112/203 X |
| 3,469,545 | 9/1969 | Hale et al. | 112/203 X |
| 3,474,747 | 10/1969 | Noiles | 112/121.12 |

*Primary Examiner*—James R. Boler

[57] ABSTRACT

A long seam apparatus comprising loading and seaming stations for seaming sheet material, having a seaming device at the seaming station and a feeding device at the loading station. The feed device has a drive member and a driven member; the drive member being movable between an idle position in which the drive and driven members are out of contact, and a drive position in which the drive and driven members are in driving engagement with material supplied to the feed device gripped between the drive and driven members which are thereupon movable from the loading station to the sending station.

10 Claims, 6 Drawing Figures

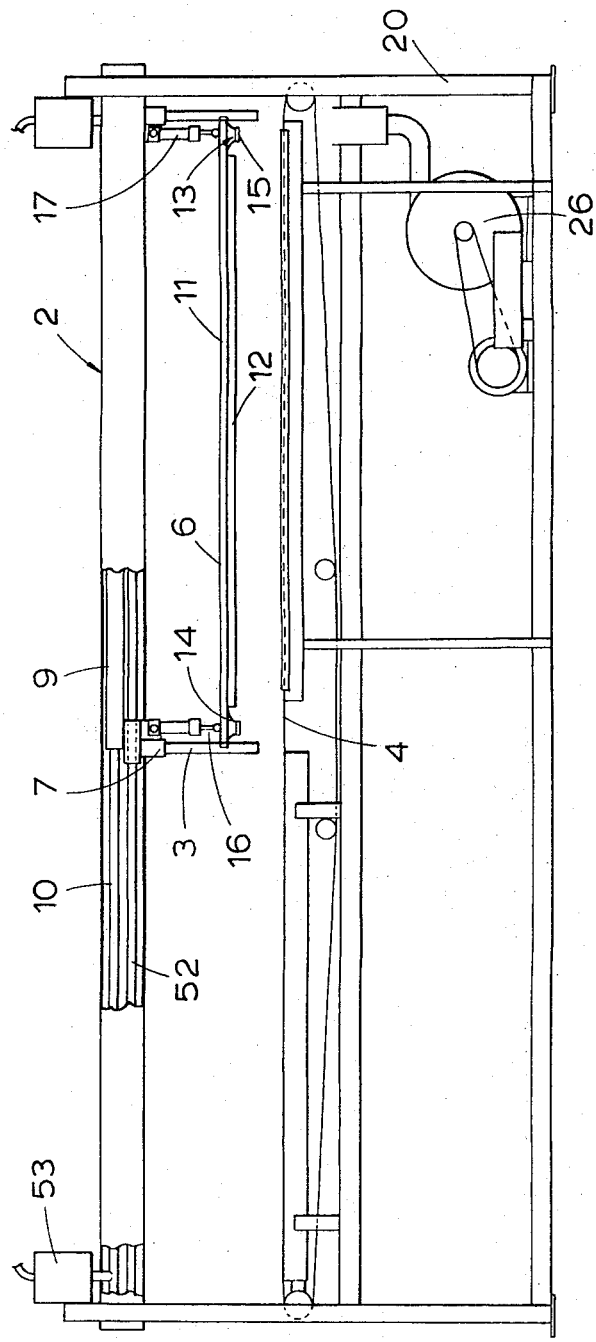

LONG SEAM MACHINE

This invention relates to seaming apparatus, and is particularly concerned with apparatus for stitching "long seams." By "long seams" and apparatus for stitching them we refer to seaming which notionally starts at a point *a* and ends at a point *b*. The edge to be seamed may be in a straight, or substantially straight, line, or may embody curved portions.

According to our invention we provide a long seam apparatus comprising loading and seaming stations for sheet material to be seamed, a seaming device at the seaming station and a feed device at the loading station which has a drive member and a driven member, the drive member being movable between an idle position in which the drive and driven members are out of contact with each other and, a drive position in which the drive and driven members are in driving engagement with each other and in which material supplied to the feed device is gripped between the drive and driven members, the two members being thereupon movable together with the gripped material from the loading to the seaming station to feed the material through the seaming device.

In one aspect of the invention we provide a long seam apparatus comprising a stitching means and a device for feeding sheets to be seamed to the stitching means, the device comprising an endless belt and a clamp member movable between an upper idle position and a lower clamping position in which one or more sheets to be seamed are gripped between the clamp member and the belt, the clamp member being supported by a carriage which is reciprocable between a loading position at which the sheet or sheets is, or are, clamped between the clamping member and the belt and a stitching position in which the clamped sheet or sheets is, or are, acted upon by the stitching means.

The driving member is generally movable in one plane between its idle and drive positions and in another plane from its drive position at the loading station to the seaming station.

In general, the leading edge of the clamp member is of firm but resilient material and will usually be composed of rubber or like elastomeric material.

A conventional material may be used for the endless belt, for example, a woven fabric or rubberised fibres.

In a particular embodiment of the invention, portions at the leading and trailing ends of the clamp member co-operate with the belt to lock the two members together so that they advance together when the clamp is lowered to its operating position.

According to a feature of our invention we provide means for locating an edge of the sheet material along a predetermined line. The means for positioning the sheet material comprise a row of apertures arranged along a line at which an edge of a sheet, or a plurality of sheets, is to be located, and means for applying suction to the apertures.

Thus, we have found that an edge of a sheet of material can be readily positioned along a particular line by providing a row of apertures along that line and applying suction to the apertures before moving the sheet material up to the line. Under the influence of the suction, the edge of the material tends to locate itself naturally along a line joining the centres of the apertures.

A sensing jet is provided supplied with a low pressure stream of air, immediately before the sewing head. The jet is interrupted firstly by the leading edge of the fabric causing the machining sequence to start. The sequence continues until the trailing edge of the fabric leaves the jet causing it to complete the stitching sequence Another important feature of the invention consists in the fact that, because of the particular design of this apparatus, the stitching heads are replaceable and interchangeable to allow any desired conventional or unconventional head to be employed in association with the feeding device which embodies the major features of the invention. The head is also of easy access, allowing a rapid change-over from one head to another. The particular mounting of the head which is employed allows ready movement of the head into, and rearwardly out of, the operating vertical plane in which stitching is effected. The head may additionally be swung round in arcuate manner when in its rearward inoperative position.

The apparatus may be readily adapted to sewing both edges which are straight or substantially straight and edges embodying portions of quite substantial curvature. In the latter case an additional device is provided, which comprises a plurality of pneumatically actuated clamps positioned immediately above the edge of sheet material.

The invention also covers a method of seaming in which a drive member is moved from an idle position to a drive position in which a driven member is drivably engaged thereby and sheet material fed to a loading station is gripped between the drive and driven members and fed thereby from the loading station to a seaming station at which an edge of sheet material is seamed, the material being then released, the drive member being returned to the loading station and the drive member being returned to its idle position for the next seaming sequence to be started.

Reference is now made to the accompanying drawings in which:

FIG. 2 is a corresponding side elevation;

Figure 1:
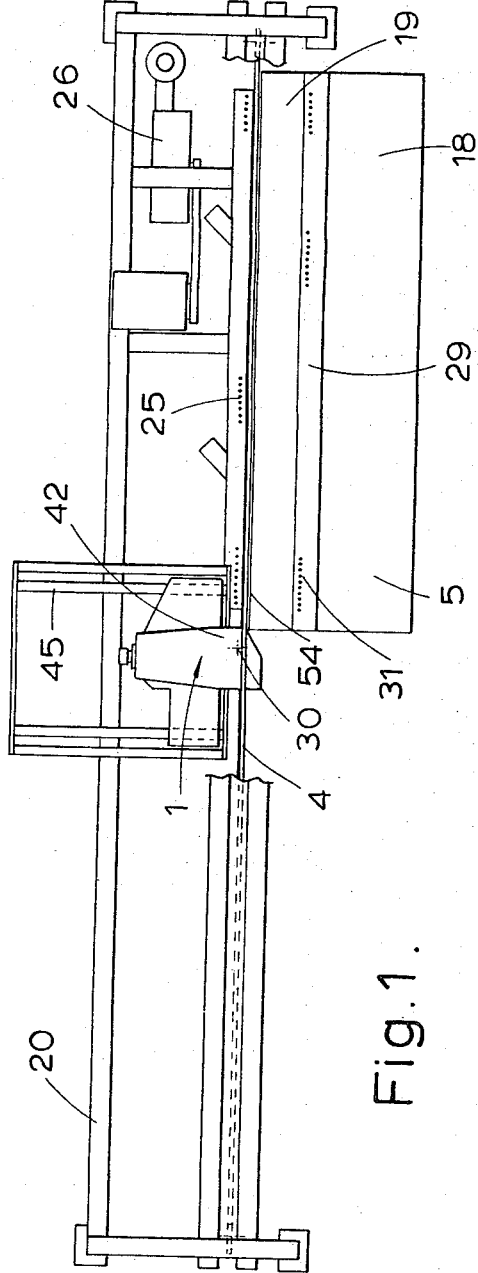
FIG. 1 is a plan view of one embodiment of long seam apparatus according to the invention.

The apparatus comprises a main frame 20, and supported on the frame, a movable position stitching head 1 and a feed device generally indicated at 2 for sheet material to be stitched. The usual feed dog of a conventional head is omitted in this embodiment. In special cases, a feed dog may be used but this has the disadvantage of requiring precise synchronism. The feed device comprises a mobile clamp 6, constituting a drive member co-operating with an endless belt 4 of rubber or rubberised material constituting a driven member.

The clamp 6 overlies the belt 4 and is vertically movable as described below between an upper idle position and a lower clamping position in which the clamp 6 co-operates with the belt 4. The belt 4 is positioned adjacent to the rear edge 54 of a loading platform 5 for the sheet material. The upper surface of the belt 4 lies substantially flush with the top surface of the platform 5.

The clamp 6 is provided with a carriage 7 which slides on rods 52. An oil-fed cylinder 9 slides on a piston rod 10 to move the carriage 7 and clamp 6 between loading and seaming stations. The oil 35 is fed to the cylinder 9 through the hollow piston rod 10 from reservoirs 53 at each end of the rod. A line 36 with branches 50 and 51, provided with valves 38 and 39, respectively, supplies a pressurised gas from a source 40 to the pressure spaces 37 above the oil in the reservoir 53.

The clamp 6 comprises a horizontal bar 11 with a bottom working edge 12 composed of rubber or like elastomeric material to provide a firm yet resilient surface.

At each end of the bar 11 are situated two positive interlocks 14 each comprising a leaf spring 13 with on its bottom surface a dimpled rubber layer 15. The edge 12 and the belt 4 give a firm grip on the material to be seamed when the clamp is in its operative position, and the interlocks 14 engage the belt 4 sufficiently firmly to ensure a positive drive throughout the seaming operation.

The clamp bar 11 is supported by a pair of vertical piston rods 16 with associated cylinders 17 and its ends run within a pair of vertical slides 3.

The loading platform 5 comprises a front table 18 and a hinged rear flap 19 which is also provided with a piston-cylinder mechanism 21 to drop the flap 19 at the commencement of stitching.

The stitching head 1 is capable of being displaced rearwardly out of the vertical stitching planes in which its needle members 30 conventionally operate. The head 1 is supported on four pillars 41 which allow its height to be adjusted so that the belt 4 runs over the bed 42 of the head 1. The pillars 41 are mounted on a platform 43 which is itself supported on a column 44. The head 1 and platform 43 are retractable on slides 45. The platform 43 can also be rotated on the column 44 to allow easy access to the head, which is easily removable from the adjustable pillars 41. Heads for use in lock stitch, over-lock stitch, chain stitch, double chain stitch and so on may be used. The head 1 is driven by a conventional electric motor 46 through an electromagnetic clutch 47 which gives controlled starting and stopping. Toothed belt drives 48 and 49, respectively, ensure a uniform stitching speed.

Four point clamps 22 are provided on a horizontal rail 8 forming part of the framework 20. The clamps 22 are movable to positions in which their heads 27 overlie the edge of the sheet material which is to be seamed. Any desired number of such additional devices may be used. The point clamps 22 may be used when material having curved edges to be seamed is employed, and they are positioned at distances apart determined by the particular arc of the curved portion of material to be seamed and the nature of the material.

Each point clamp 22 is operated by a pneumatic valve 32, which is manually actuated at 33. The operation of the point clamps is manually started and stopped as needed, but automatically cut off in the course of the sequence of stitching operations. The clamps 22 are not needed in the case of material with straight edges only or in the case of edges with only shallow curvature.

Figure 3:
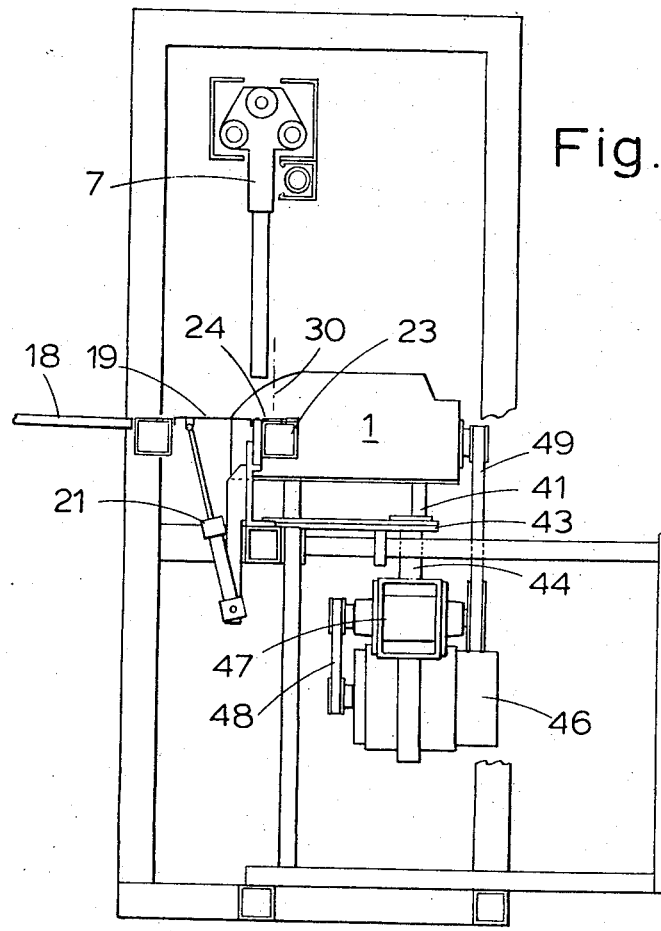
FIG. 3 is a corresponding end view.
Figure 3A:
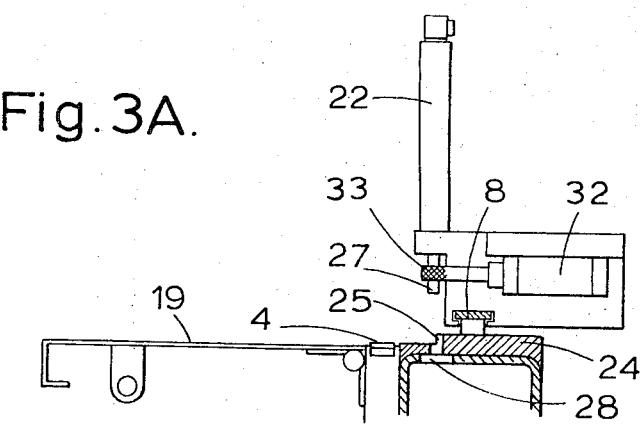
FIG. 3A is an enlarged view of a detail of FIG. 3.

A device for locating the sheet edges comprises a vacuum manifold 23 which is an extruded box section channel running the length of the loading platform 5. The manifold 23 has a longitudinal slot 28 along the front of the top face. Over this slot is placed a brass or plastics sheet 24 having milled vacuum inlets 25 evenly spaced along its length which coincide with the slot 28 in the manifold 23. The inlets are shaped as shown in FIG. 3A to exert a two-way pull on the material fed towards them. The pull is exerted both downwardly and horizontally rearwardly. An industrial vacuum unit 26 is directly connected to the manifold 23, air being exhausted through the inlets 25. Provision is made for the vacuum to be shut off automatically at the commencement of seaming, the vacuum being restored at the end of the seaming sequence.

The mobile carriage 7 supporting the clamp 6 is provided with a speed control (not shown) which provides a means for controlling the rate of transverse of the clamp 6 through the stitching head 1. This provides a means of varying the number of stitches per inch in the seam.

The usual feed dog of a stitching head may be omitted if this option is needed.

The operation of the apparatus just described is as follows:

At the loading station adjacent to the platform 5, the operator feeds sheet material across the platform 5 towards the line of vacuum inlets 25. During this time, the inlets 25 are under suction. The two-way pull on the material locates the front edge of the material along the line of inlets 25. As the edge of the material reaches the inlets 25, the suction draws the edge half-way across each inlet, thus positioning it along a median line determined by the row of inlets 25.

Figure 2A:
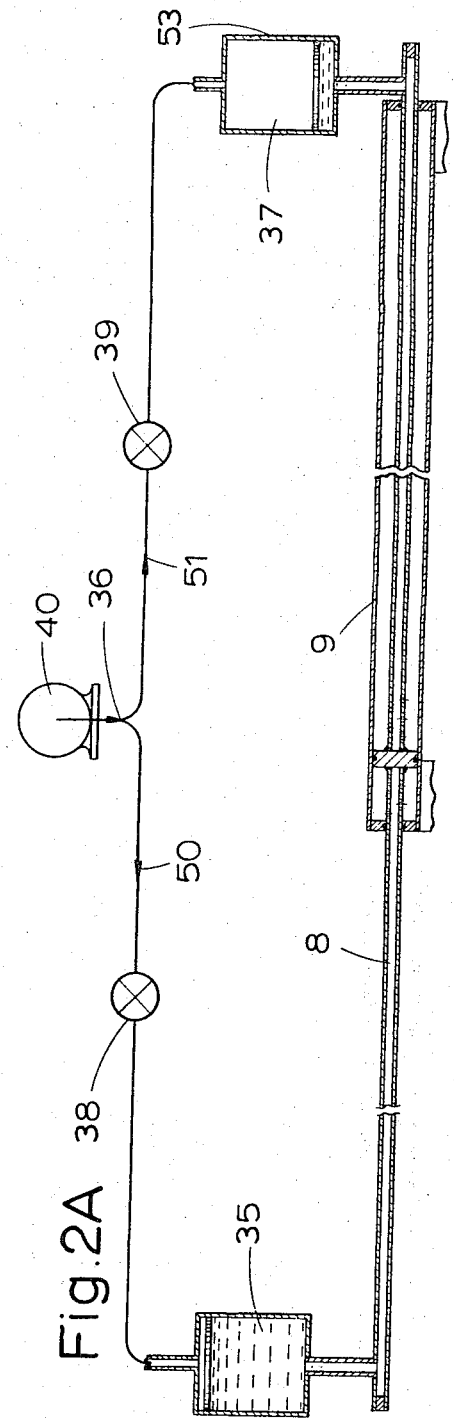
FIG. 2A shows a detail of FIG. 2.

The operator then actuates two starting buttons (not shown) positioned where most convenient to the operator. This initiates the sequence of operations. The clamp bar 11 is pneumatically lowered by the rods 16 to grip the fabric along its entire length between the bar 11 and the belt 4. The interlocks 14 engage with the top friction surface of the belt 4 to provide a positive drive of the belt 4 by the clamp 6 during the lateral travel of the clamp in the feed direction produced by the drive cylinder 9. This is produced by opening the valve 38 in the line 50 and closing this valve 39. (Reverse lateral travel of the carriage 7 and clamp 6 is produced by closing the valve 38 and opening the valve 39 (as in FIG. 2A)). During this time, the back locating vacuum exerted by the inlets 25 is off. If point clamps 22 are used, they are then at their neutral positions. The feed device 2 now takes the material through the head 1 at the seaming station.

In travel to the seaming station, the leading end of the fabric passes between a pair of opposed sensing nozzles (not shown), which maintain a sensing jet, interrupting the jet. This starts the seaming sequence.

The electromagnetic clutch is signalled to start the machine stitching. The operation of a venturi (not shown) produces a localised vacuum which collects the existing chain stitch, drawing it between reciprocating knives (not shown) which cut the chain on the leading edge of the facric to the desired length. The machine continues stitching and the carriage 7 continues movement forward at uniform speed until the trailing edge of the fabric leaves the sensing jet. To conserve air, the venturi is switched off after the commencement of stitching and brought in again before the end of stitching. The head 1 and the venturi are stopped at the appropriate time in order that the tail thread on the trailing edge of the fabric may be of a controlled length. The clamp bar 11 lifts, releasing the stitched material, and the clamp 6 reverses to the starting position.

When sheet material with curved portions at the edge or edges to be stitched together is employed, the point clamps 22 are positioned one at each end of each curved portion and are manually actuated before the commencement of the sequence of seaming operations. The clamps 22 have their positions adjusted on their supporting rail 8 in accordance with the lengths of the curved portions and the nature of the material. The operator straightens out each curve and actuates the point clamps 22. The clamp heads 27 ensure a positive hold on the material. The point clamps 22 are automatically cut off during the seaming sequence to allow forward feeding of the material by the clamp 6, and, when not needed, they can be manually released.

Figure 4:
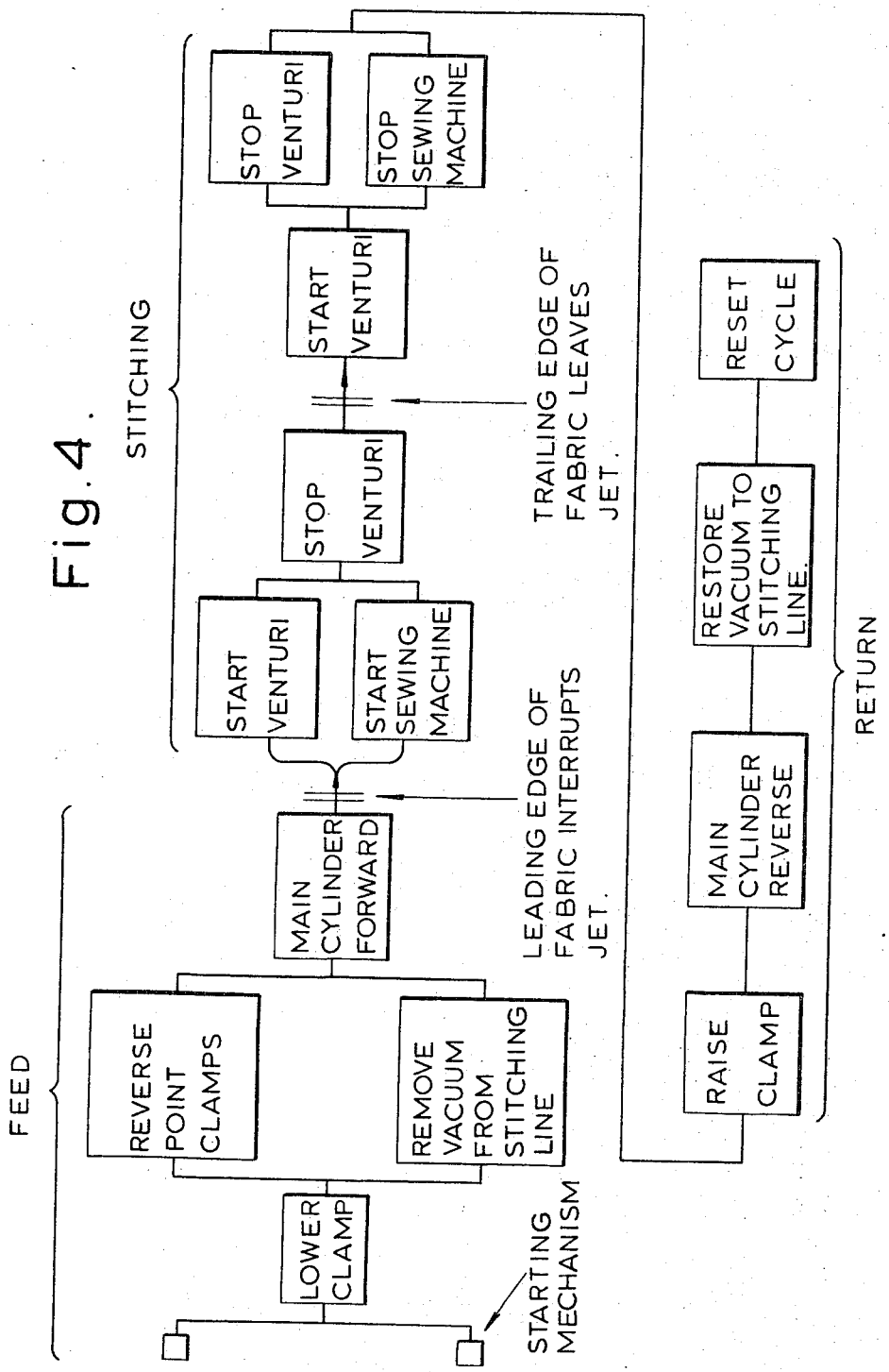
FIG. 4 is a chart of the different operations.

FIG. 4 shows the different operations in the seaming sequence. The sequence has been arbitrarily broken up into "feed," "stitching" and "return" stages.

In a modification of the structure and operation described above, further suction means may be provided by installing between the front loading table 18 and the rear flap 19, a further vacuum manifold 29 also of box section, having in its upper face, flush with the table 18 and flap 19, a row of vacuum inlets 31, through which a vacuum pull is exerted upon the fabric in similar manner to the locating pull exerted by the inlets 25 on the front edge of the sheet material. This allows prealignment of difficulty alignable fabrics. Prealignment is effected in one step whilst previously aligned and clamped material is going through the seaming sequence.

The apparatus may also comprise an external loading mechanism (not shown), which comprises a locating member having a straight edge, along which a piece or pieces of fabric are aligned and pinned or clamped, the aligned pieces being then automatically transferred to the stitching line of the mechanism. The sequence, as described previously, then takes place.

It will be appreciated that various modifications may be made and additional refinements, without departing from the broad nature and scope of the invention defined in the opening paragraphs of this specification. Thus, for example, for thinner and more flexible material, smaller vacuum locating holes will generally be required.

The apparatus is designed so that the hemming of fabrics with conventional folders or with the use of air jets is made possible; the attaching of bindings, tapes and so on, and like operations can also be carried out with this apparatus.

Although seaming by stitching has been particularly described, other forms of seaming are contemplated, e.g. seaming of plastics material by means of a welding head.

The apparatus has a number of advantages over known apparatus. In particular, it achieves for the first time an entirely positive hold on the fabric which is fed past the stitching head.

The vacuum location at the stitching line is a further major advantage; the vacuum pre-alignment is another important feature.

The apparatus is able to accommodate a whole variety of existing stitching heads which are simply substituted for one another as needed. It is therefore highly flexible in use.

We claim:
1. A long seam apparatus comprising loading and seaming stations for sheet material to be seamed, a seaming device at the seaming station and a feed device at the loading station which has a drive member and a driven member, means for moving the drive member between an idle position in which the drive and driven members are out of contact with each other and a drive position in which the drive and driven members are in driving engagement with each other and in which material supplied to the feed device is gripped between the drive and driven members, means for moving the two members together with the gripped material from the loading to the seaming station to feed the material through the seaming device.

2. An apparatus according to claim 1, in which the drive member is movable in one direction between its idle and drive positions and in another direction from its drive position at the loading station to the seaming station.

3. An apparatus according to claim 1 in which the drive member comprises a carriage which is reciprocable between the loading and seaming stations, and means for clamping the drive and driven members, together to provide driving engagement therebetween.

4. An apparatus as claimed in claim 1 in which the driven member comprises an endless belt engageable by the drive member in the drive position thereof.

5. An apparatus as claimed in claim 1 in which there is additionally provided at the loading station a locating means for the sheet material which is to be gripped and fed through the seaming device, the locating means comprising a suction means with a series of inlets therefor disposed along a locating region for the edge to be seamed.

6. An apparatus as claimed in claim 1, in which a plurality of additional clamping means are provided, the additional clamping means being positioned, or movable to positions, at the loading station adjacent to and overlying a locating region for the edge to be seamed, the distance between two, or any two, additional clamping means being adjustable according to the length of an edge of sheet material to be clamped thereby.

7. An apparatus according to claim 1 which comprises further suction means having a row of inlets therefor which are positioned at the loading station adjacent to a locating region for the edge to be seamed, the additional suction means providing pre-alignment of sheet material to be seamed.

8. A log seam apparatus comprising a stitching means and a device for feeding sheets to be seamed to the stitching means, the device comprising an endless belt and a clamp member, means for moving said clamp member between an upper idle position and a lower clamping position in which one or more sheets to be seamed are gripped between the clamp member and the belt, the clamp member geing supported by a carriage, means for reciprocating said carriage between a loading position at which the sheet or sheets is or are, clamped between the clamping member and the belt and a stitching position in which the clamped sheet or sheets is, or are, acted upon by the stitching means.

9. A method of seaming in which a drive member is moved from an idle position to a drive position in which a driven member is drivably engaged thereby and sheet material fed to a loading station is gripped between the drive and driven members and fed thereby from the loading station to a seaming station at which an edge of the sheet material is seamed, the material being then released, the drive member being returned to the loading station and the drive member being returned to its idle position for the next seaming sequence to be started.

10. A method according to claim 9 in which the drive member is moved in one direction between its idle and drive positions, and in another direction from its drive position at the loading station to the seaming station.

* * * * *